(12) United States Patent
Fujiuchi et al.

(10) Patent No.: US 9,128,217 B2
(45) Date of Patent: Sep. 8, 2015

(54) ILLUMINATING APPARATUS, IMAGE SENSOR, AND METHODS FOR MANUFACTURING ILLUMINATING APPARATUS AND IMAGE SENSOR

(71) Applicants: Akiko Fujiuchi, Chiyoda-ku (JP); Daisuke Ohama, Chiyoda-ku (JP); Toru Aramaki, Chiyoda-ku (JP)

(72) Inventors: Akiko Fujiuchi, Chiyoda-ku (JP); Daisuke Ohama, Chiyoda-ku (JP); Toru Aramaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/375,600

(22) PCT Filed: Nov. 30, 2012

(86) PCT No.: PCT/JP2012/081079
§ 371 (c)(1),
(2) Date: Jul. 30, 2014

(87) PCT Pub. No.: WO2013/161115
PCT Pub. Date: Oct. 31, 2013

(65) Prior Publication Data
US 2015/0015924 A1    Jan. 15, 2015

(30) Foreign Application Priority Data
Apr. 25, 2012   (JP) .................................. 2012-100204

(51) Int. Cl.
*H04N 1/04*    (2006.01)
*F21V 8/00*    (2006.01)
(Continued)

(52) U.S. Cl.
CPC ............ *G02B 6/0005* (2013.01); *F21V 29/004* (2013.01); *H04N 1/0249* (2013.01);
(Continued)

(58) Field of Classification Search
CPC .......... F21V 5/008; F21V 5/046; F21V 7/00;
F21V 7/0016; F21V 7/0091; F21V 7/05;
G02B 6/0001; G02B 6/0035; G02B 23/2484;
G02B 6/0016; G02B 6/0095; G02B 19/0028;
G02B 19/0061; G02B 23/2423
USPC .......................... 358/475, 497; 362/611, 613
See application file for complete search history.

(56) References Cited

U.S. PATENT DOCUMENTS 5,945,664 A * 8/1999 Ogura ......................... 250/208.1
2002/0030798 A1   3/2002 Tabata et al.
(Continued)

FOREIGN PATENT DOCUMENTS

JP    2002-190917    7/2002
JP    2008-227815    9/2008
(Continued)

OTHER PUBLICATIONS

International Search Report issued Mar. 5, 2013, in PCT/JP2012/081079, filed Nov. 30, 2012.
Office Action issued on May 19, 2015 in corresponding Taiwan Patent Application No. 102104330 (with English translation).

*Primary Examiner* — Negussie Worku
(74) *Attorney, Agent, or Firm* — Oblon, McClelland, Maier & Neustadt, L.L.P.

(57) ABSTRACT

An illuminating apparatus includes a columnar light guide, a board having a light source fastened on one surface thereof, and a holder. The holder is formed with a through-hole into which an end of the light guide in the columnar center axis direction is fitted to hold the light guide, and a catch that catches and holds the board with the light source facing the end surface of the light guide in the columnar center axis direction in the through-hole.

4 Claims, 10 Drawing Sheets

(51) Int. Cl.
*H04N 1/028* (2006.01)
*H04N 1/024* (2006.01)
*F21V 29/00* (2015.01)
*H04N 1/031* (2006.01)

(52) U.S. Cl.
CPC ......... *H04N1/0289* (2013.01); *H04N 1/02815* (2013.01); *H04N 1/02835* (2013.01); *H04N 1/0318* (2013.01); *H04N 2201/0081* (2013.01); *H04N 2201/02462* (2013.01); *H04N 2201/02466* (2013.01); *H04N 2201/02474* (2013.01); *H04N 2201/02485* (2013.01); *H04N 2201/03112* (2013.01); *H04N 2201/03125* (2013.01); *H04N 2201/03129* (2013.01); *H04N 2201/03141* (2013.01); *H04N 2201/03145* (2013.01)

(56) References Cited

U.S. PATENT DOCUMENTS

| | | |
|---|---|---|
| 2004/0165226 A1 | 8/2004 | Tomita et al. |
| 2009/0168126 A1 | 7/2009 | Saito et al. |
| 2010/0231816 A1 | 9/2010 | Mikajiri |
| 2014/0111835 A1* | 4/2014 | Ozawa et al. ............... 358/475 |

FOREIGN PATENT DOCUMENTS

| | | |
|---|---|---|
| JP | 2010-160461 | 7/2010 |
| JP | 2010-283436 | 12/2010 |
| TW | 412905 | 11/2000 |
| TW | 200740187 | 10/2007 |

* cited by examiner

ILLUMINATING APPARATUS, IMAGE SENSOR, AND METHODS FOR MANUFACTURING ILLUMINATING APPARATUS AND IMAGE SENSOR

TECHNICAL FIELD

The present disclosure relates to an illuminating apparatus of a line light source applied to image reader apparatuses, such as a copying machine and a multifunction machine and the like, an image sensor employing the same, and a method for manufacturing those illuminating apparatus and image sensor.

BACKGROUND ART

It becomes necessary for an image sensor utilizing an illuminating apparatus of a line light source applied to an image reader apparatus to ensure uniform light emission in a main scanning direction (a lengthwise direction), and a reading depth (a focal depth) in accordance with an improvement of a resolution. Example conventional technologies known are as follows. Patent Literature 1 discloses a mechanism in which an optical housing secures a liquid crystal element.

In addition, FIG. 1 of Patent Literature 2 discloses an illuminating apparatus that causes a lighting element to emit light through an end face of a cylindrical light guide that is long in the main scanning direction to uniformly emit light in the scanning direction. More specifically, the light guide and a lighting element board on which the lighting element is mounted are attached to a holder, and are positioned relative to each other. This holder is secured to a frame by engagement pins provided at both end faces of the holder in the sub scanning direction (a shorter direction) and a positioning hole formed in a wall of the frame. Note that an example image sensor of Patent Literature 2 is a contact image sensor (CIS).

Still further, in accordance with an increase of an output by a light source applied to an illuminating system of a contact image sensor, an efficient heat radiation structure for a light source is necessary. FIG. 4 of Patent Literature 3 discloses that an LED chip that is a light source is mounted on a metal plate, and a bent heat radiation plate is attached to a planar portion at an opposite face side of the LED chip to perform heat radiation on the light source.

CITATION LIST

Patent Literature

Patent Literature 1: Unexamined Japanese Patent Application Kokai Publication No. 2010-160461
Patent Literature 2: Unexamined Japanese Patent Application Kokai Publication No. 2010-283436
Patent Literature 3: Unexamined Japanese Patent Application Kokai Publication No. 2008-227815

SUMMARY OF INVENTION

Technical Problem

According to the technology disclosed in Patent Literature 1, however, a positioning in the shorter length direction (the Y direction in FIG. 5 of Patent Literature 1) is difficult, resulting in a variability in precision at the time of assembling.

According to the illuminating apparatus disclosed in Patent Literature 2, although the holder is secured to the frame through the engagement pin of the holder and the positioning hole formed in the wall of the frame, a document is fed on the cover glass attached on the frame. Hence, the variability in height from the light guide to the document is a total of the variability in respective dimensions of the light guide, the holder, the frame and the cover glass. As a result, the light amount emitted from the light source to the document may largely vary device by device.

In addition, according to a contact image sensor utilizing an illuminating apparatus disclosed in Patent Literature 3, in order to improve the heat radiation efficiency of the illuminating apparatus, a structure having a plate spring that secures a heat radiation plate and another heat radiation plate is employed. Hence, such a structure becomes complex.

The present disclosure has been made in order to address the aforementioned technical problems, and it is an objective of the present disclosure to improve a precision in a distance from a light source (a light guide) to a document (a reading object) with a simple structure.

Solution to Problem

To accomplish the above objective, an illuminating apparatus according to an aspect of the present disclosure includes: a columnar light guide; a board including a light source fastened on one surface thereof; and a holder formed with a through-hole into which an end of the light guide in a columnar center axis direction is fitted to hold the light guide, and a catch that catches and holds the board with the light source facing with an end face of the light guide in the columnar center axis direction in the through-hole.

Advantageous Effects of Invention

According to the present disclosure, the positional relationship among the light guide, the light source board, and the heat radiator can be adjusted by the holder only, and thus the optical axis can be easily and precisely aligned to a reading object like a document.

DESCRIPTION OF EMBODIMENTS

Embodiments of the present disclosure to carry out the present disclosure will be explained in detail below with reference to the accompanying drawings. The same or corresponding portion in the figures will be denoted by the same reference numeral.

Embodiment 1

Embodiment 1 relates to an illuminating apparatus applied to an image sensor that reads a fed reading object. According to Embodiment 1, an explanation will be given of this illuminating apparatus, the image sensor employing the same, and a method for manufacturing those illuminating apparatus and image sensor. In the present application, a fed reading object (feeding of reading object) means not only a case in which the reading object itself is fed but also a case in which the reading object is still and the image sensor itself travels in the sub scanning direction. Embodiment 1 of the present disclosure will be explained below with reference to FIGS. 1 to 11.

Figure 1:
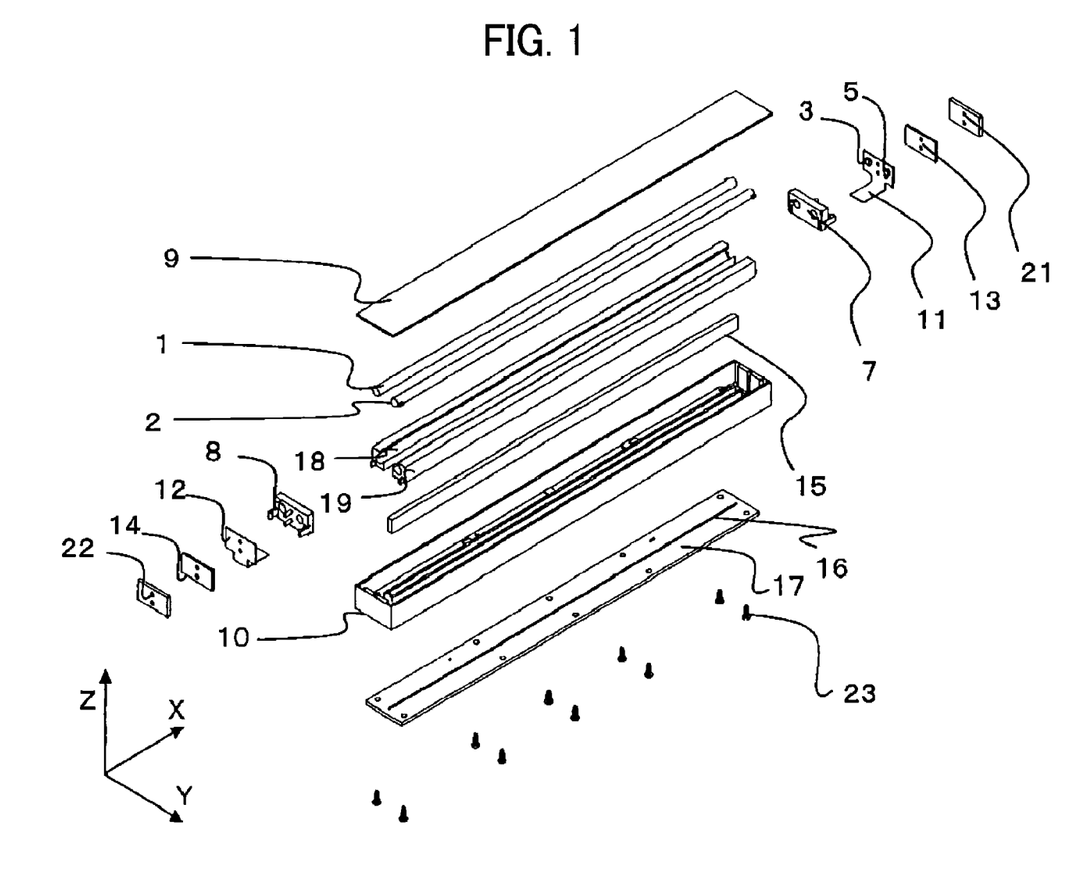
FIG. 1 is an exploded view illustrating an image sensor according to Embodiment 1 of the present disclosure.

FIG. 1 is an exploded view illustrating the image sensor according to Embodiment 1 of the present disclosure. In this figure, three axes that are X, Y, and Z are illustrated. Among those axes, X indicates an X axis that is the main scanning direction of the image sensor. In FIG. 1, the main scanning direction is the lengthwise direction of the image sensor and that of the illuminating apparatus. Y indicates a Y axis that is the sub scanning direction of the image sensor (a feeding direction of the fed reading object). In FIG. 1, the sub scanning direction is the shorter direction of the image sensor and that of the illuminating apparatus. Z indicates a Z axis that is a focal depth direction of the image sensor. In FIG. 1, the focal depth direction is the thickness direction of the image sensor and that of the illuminating apparatus. The focal depth direction is also, when the image sensor is a contact image sensor, an optical axis direction of a rod lens array. In Embodiment 1, a reading width direction of the image sensor indicates the main scanning direction, while the reading width is the length of a main scanning.

A light guide 1 illustrated in FIG. 1 is formed of a transparent resin, and is formed in a columnar shape having a center line oriented in the lengthwise direction. In addition, the light guide 1 has the center line (lengthwise direction) disposed in parallel with the main scanning direction, and the side face of the light guide is formed in a cylindrical shape, and thus an end face is formed in a circular shape. A light guide 2 is disposed substantially parallel with the light guide 1 in the lengthwise direction. Features of the light guide 2 in FIG. 1 like the other shapes of such a light guide are the same as those of the light guide 1. The light guide 1 and the light guide 2 form a lighting unit of the illuminating apparatus. The shapes of the side faces of the light guide 1 and the light guide 2 are not limited to the cylindrical shape, and the shapes of the end faces of the light guide 1 and the light guide 2 are also not limited to the circular shape.

A light source 3 is a light source element like an LED that emits light into one end face of the light guide 1. A light source 4 (see FIG. 5 to be discussed later) that emits light into the other end face of the light guide 1 like an LED is also disposed at the other end face. A light source 5 is a light source element like an LED that emits light into one end face of the light guide 2. A light source 6 (see FIG. 5 to be discussed later) that emits light into the other end face of the light guide 2 like an LED is also disposed at the other end face. The light guide 1 and the light guide 2 guide the incident light from the respective end faces in a center axis direction, and emit the guided light through the side face.

One end of the light guide 1 in the lengthwise direction is fitted in a holder 7 in such a way that the light source 3 is disposed so as to face the one end face of the light guide 1. In addition, the one end of the light guide 2 is also fitted in the holder in such a way that the light source 5 is disposed so as to face the one end face of the light guide 2. Likewise, the other end of the light guide 1 is fitted in a holder 8 in such a way that the light source 4 is disposed so as to face the other end face of the light guide 1. In addition, the other end of the light guide 2 is fitted in this holder in such a way that the light source 6 is disposed so as to face the other end face of the light guide 2. The holder 7 and the holder 8 hold a reflector 18 and a reflector 19, and the reflector 18 and the reflector 19 are disposed along the side faces of the light guide 1 and the light guide 2 respectively (light guide casing).

A clear plate 9 is a cover for the illuminating apparatus or the image sensor which is formed of glass or a transparent resin. In the case of a reflective contact image sensor, a reading object like a document or a bank bill is fed on this cover. A casing 10 is a frame body, and is formed with a step portion which is located at an edge of the one aperture and which supports the clear plate 9 along at least the X direction. That is, the steps of the step portion are formed as steps in the Y direction (corresponding to feeding direction of reading object). However, the steps in the Y direction may be formed at the holder 7 and the holder 8.

When this clear plate 9 is provided at an image reader apparatus like a copying machine or a multifunction machine in which the image sensor itself of Embodiment 1 is built, this clear plate becomes unnecessary in some cases. A hole to attach the casing 10 to the image reader apparatus like a copying machine or a multifunction machine by a screw or a bolt may be formed outwardly in the main scanning direction of the image sensor relative to the reading width, for example, both ends of the casing 10 in the Y direction and external sides of the holder 7 and the holder 8.

A lens body 15 is an optical member or a composite optical member which converges, when light emitted from the light guide 1 and the light guide 2 are reflected by the reading object, the reflected light. According to Embodiment 1, the lens body 15 is a rod lens array. The lens body 15 is disposed between the light guide 1 and the light guide 2 so as to face a sensor board 17. The sensor board 17 is a circuit board on which a sensor 16 is mounted.

As to the detail in FIG. 1, a light source board 11 and a light source board 12 attached between the holder 7, the holder 8 and the casing 10, a heat radiation sheet 13, a heat radiation sheet 14, and, a heat radiation plate 21 and a heat radiation plate 22 are illustrated but the details thereof will be explained later.

Figure 2:
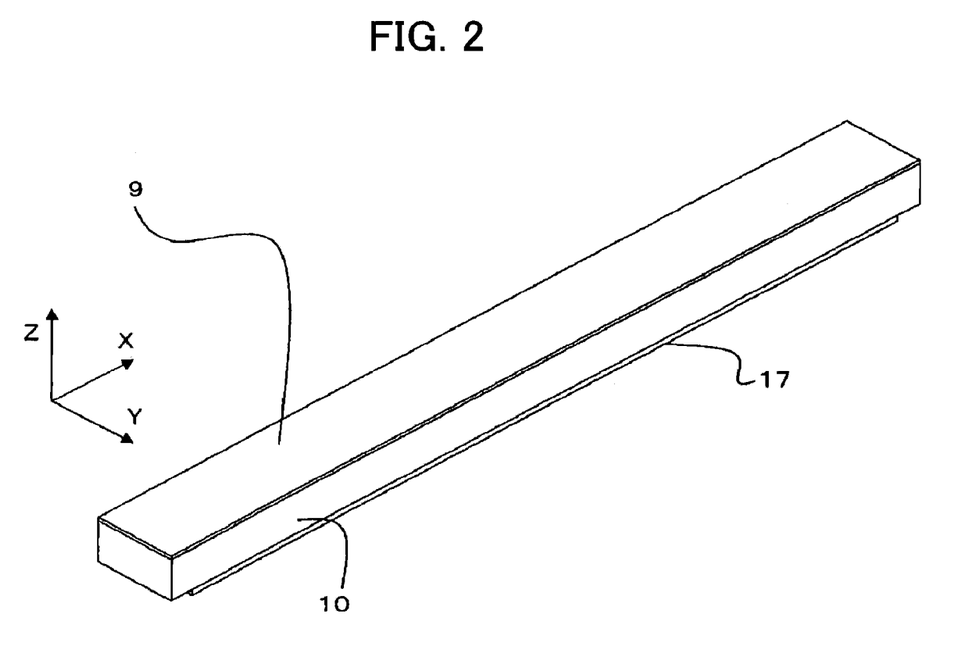
FIG. 2 is an external view of the image sensor according to Embodiment 1.

FIG. 2 is an external view of the image sensor according to Embodiment 1. With the light guide 1 and the light guide 2, the reflector 18 and the reflector 19, the holder 7 and the holder 8, and the lens body 15 all illustrated in FIG. 1 being assembled, those elements are retained in the casing 10, the clear plate 9 is attached to the upper aperture thereof, and the sensor board 17 is attached to the bottom thereof, thereby forming an image sensor illustrated in the external view of FIG. 2.

Figure 3:
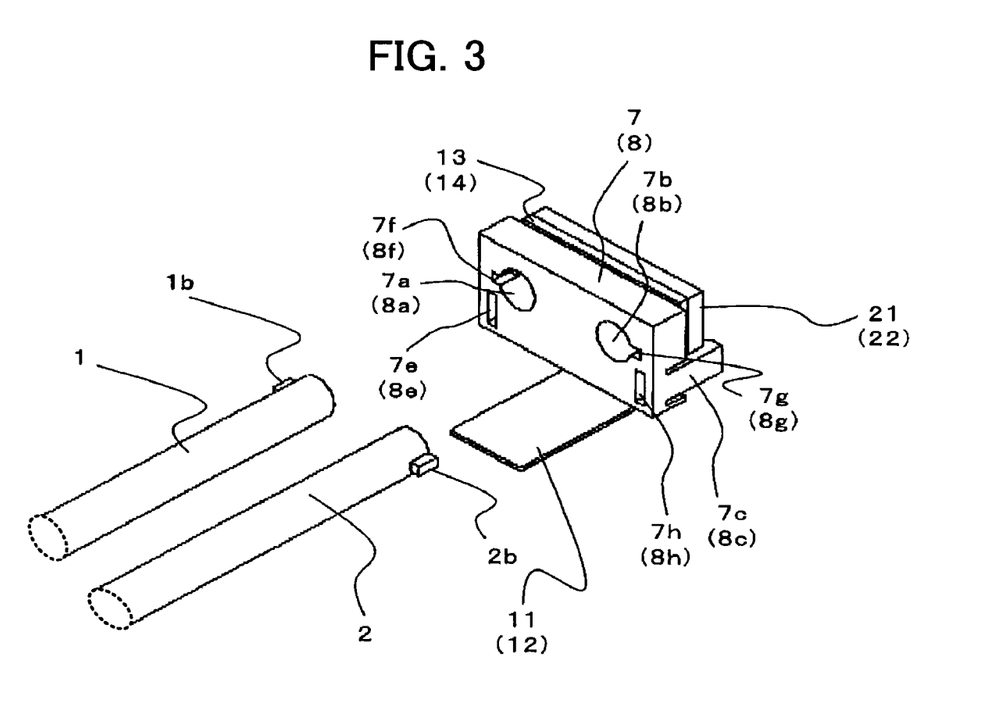
FIG. 3 is an exploded view illustrating a light guide and a holder in the image sensor (illuminating apparatus) of Embodiment 1.

FIG. 3 is an exploded view of the light guide and the holder in the image sensor (illuminating apparatus) according to Embodiment 1. The image sensor (illuminating apparatus) is symmetrical at both ends of a main scanning relative to the center line of the sub scanning direction. Hence, in the following explanation, only one side of the image sensor (illuminating apparatus) will be described, and the reference numeral of the opposite side will be bracketed. The bracketed reference numeral in the figure indicates a structure of a mirror-symmetrical opposite side of the light guide 1.

The holder 7 (8) includes an insertion hole 7a (8a) and an insertion hole 7b (8b) into which the light guide 1 and the light guide 2 are fitted, respectively. A notch 7f (8f) and a notch 7g (8g) are formed in the respective inner circumferences of the insertion hole 7a (8a) and the insertion hole 7b (8b). The notch 7f (80) and the notch 7g (8g) are formed in shapes that are engageable with a protrusion 1b formed on the circumference of the end of the light guide 1 and a protrusion 2b formed on the circumference of the end of the light guide 2, respectively. According to this structure, when the light guide 1 and the light guide 2 are fitted in the holder 7 (8) (insertion hole 7a (8a) and insertion hole 7b (8b)), the light guide 1 and the light guide 2 can be fastened to the holder 7 (8) in a predefined direction. That is, the protrusion 1b and the protrusion 2b can serve as engagements.

The holder 7 (8) also includes a reflector holding hole 7e (8e) and a reflector holding hole 7h (8h). The reflector holding hole 7e (8e) and the reflector holding hole 7h (8h) are slots adjoining to a heat radiator holder 7c (8c) and a heat radiator holder 7d (8d) to be discussed later (see FIG. 4 to be discussed later), and have a function of holding the reflector 18 and the reflector 19.

The insertion hole 7a (8a) and the insertion hole 7b (8b) illustrated in FIG. 3 are each a through-hole (opening) passing all the way through the surface of the holder 7 (8) where the light guide 1 and the light guide 2 are fitted, and a surface opposite to this surface (causing those surfaces in communication with each other). In order to secure the light guide 1 and the light guide 2, the notch 7f (8f) and the notch 7g (8g) are formed in the internal walls of the insertion hole 7a (8a) and the insertion hole 7b (8b) up to a certain depth from the surface where the light guide 1 and the light guide 2 are fitted. However, instead of forming the notch 7f (8f) and the notch 7g (8g) in the insertion hole 7a (8a) and the insertion hole 7b (8b), for example, the internal diameters of the insertion hole 7a (8a) and the insertion hole 7b (8b) may be gradually reduced to snug-fit the light guide 1 and the light guide 2.

It is appropriate if the insertion hole 7a (8a) and the insertion hole 7b (8b) optically pass all the way through the surface of the holder 7 (8) where the light guide 1 and the light guide 2 are fitted, and a surface opposite to that surface. That is, as long as lights from the light source 3 (5) and the light source 4 (6) can be transmitted to the light guide 1 and the light guide 2, such insertion holes may be a hole that blocks off a physical object. More specifically, it is unnecessary that all portions between the end face of the light guide 1 and the light source 3 (4) be a hollow space. Likewise, it is unnecessary that all portions between the end face of the light guide 2 and the light source 5 (6) be a hollow space. In addition, even if the insertion hole 7a (8a) and the insertion hole 7b (8b) are through-holes (openings), a transparent substance that transmits light to the light guide 1 and the light guide 2 may be inserted in those through-holes. Still further, the light guide 1 and the light guide 2 have the light source 3 (5) and the light source 4 (6) disposed at "both end faces", but the light source may be disposed at either one end face. In this case, it is desirable that an end face where no light source is disposed should be formed so as to reflect light toward the light guide. Note that light emitted from the light guide 1 and the light guide 2 is a line light source.

Figure 4:
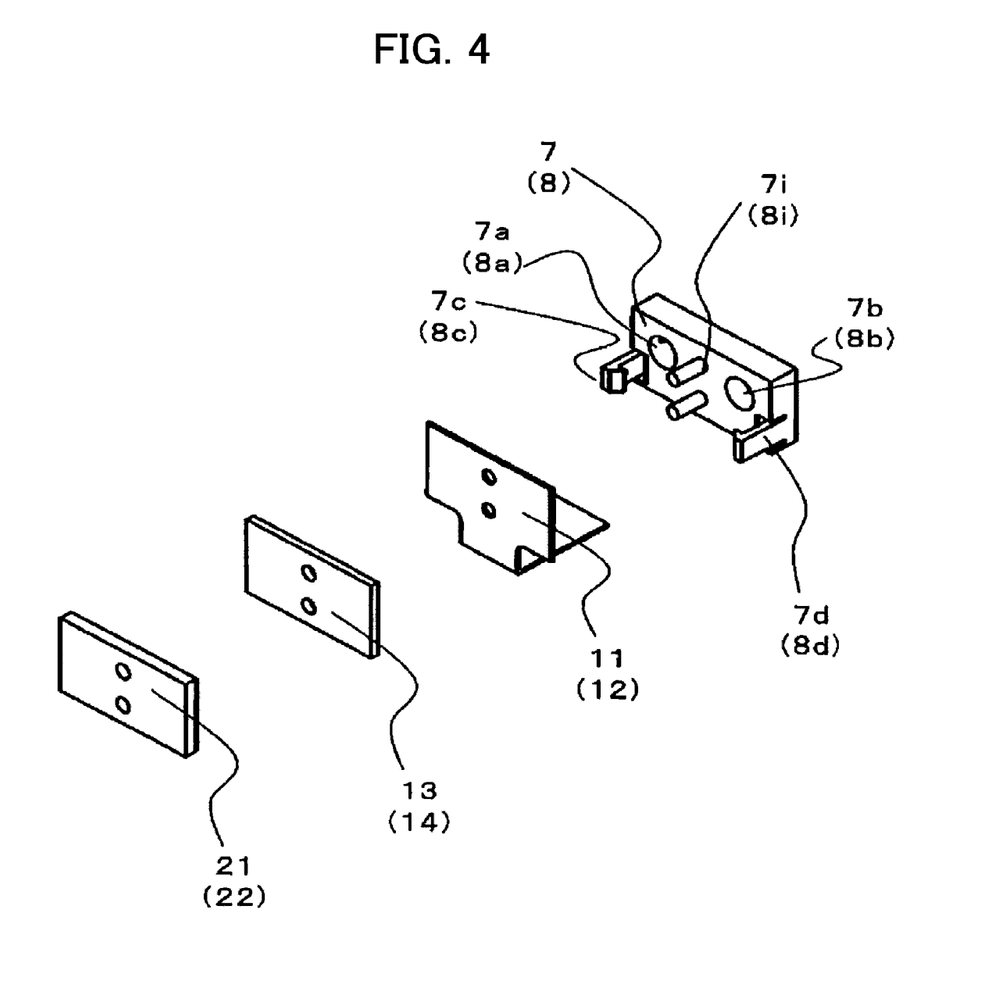
FIG. 4 is an exploded view illustrating the holder and a light source in the image sensor (illuminating apparatus) of Embodiment 1.

FIG. 4 is an exploded view illustrating the holder and the light source in the image sensor (illuminating apparatus) according to Embodiment 1. The holder 7 also includes the heat radiator holder 7c (8c) and the heat radiator holder 7d (8d). The heat radiator holder 7c (8c) and the heat radiator holder 7d (8d) are formed on a surface facing with the fed reading object in the surface continuous from the surface where the openings into which the light guide 1 and the light guide 2 are fitted are formed, and holds the light source board 11 (12), the heat radiation sheet 13 (14) and the heat radiation plate 21 (22).

More specifically, the heat radiator holder 7c (8c) and the heat radiator holder 7d (8d) are fitting claws (catches) formed on the holder 7 (8) along at least the shorter direction (shorter direction of casing 10) to hold the light source board 11 (12), the heat radiation sheet 13 (14), and the heat radiation plate 21 (22) together.

The holder 7 includes a board positioner 7i (8i). The board positioner 7i (8i) is, for example, a protruding pin, and positions the light source board 11 (12) in the Y direction and the Z direction in accordance with a fitting into a hole in the light source board 11 (12). When the board positioners 7i (8i) are provided at two locations, a rotation of the light source board 11 around the main scanning direction is preventable. Meanwhile, when a step to support the clear plate 9 to the holder 7 (8) is formed, such a step may be formed at a side face of the holder 7 (8) or may be formed at a surface where the board positioner 7i (8i) is formed.

The light source board 11 (12) illustrated in FIG. 3 and FIG. 4 is a flexible substrate on which the light source 3 (4) and the light source 5 (6) are mounted. The heat radiation sheet 13 (14) is disposed so as to contact an opposite surface of the light source board 11 (12) to the surface where the light source 3 (4) and the light source 5 (6) are formed, and radiates heat from the light source board 11 (12).

The heat radiation plate 21 (22) is disposed so as to face an opposite surface of the heat radiation sheet 13 (14) to the surface contacting the light source board 11 (12), and is formed of a plate with a high heat radiation characteristic like a metal that radiates heat from the light source board 11 (12).

The light source board 11 (12), the heat radiation sheet 13 (14), and the heat radiation plate 21 (22) have holes, respectively. When the board positioners 7i (8i) are fitted in the respective holes from the holder 7 (8), the light source board 11 (12), the heat radiation sheet 13 (14), and the heat radiation plate 21 (22) are secured to the holder 7 (8) in the Y direction and the Z direction (including a provisional securing condition). In addition, as explained above, the heat radiator holder 7c (8c) and the heat radiator holder 7d (8d) catch and secure the light source board 11 (12), the heat radiation sheet 13 (14), and the heat radiation plate 21 (22) in the X direction. Accordingly, the intimate contact among the light source board 11 (12), the heat radiation sheet 13 (14), and the heat radiation plate 21 (22) can be enhanced, thereby efficiently radiating Joule heat generated by the light source board 11 (12).

Figure 5:
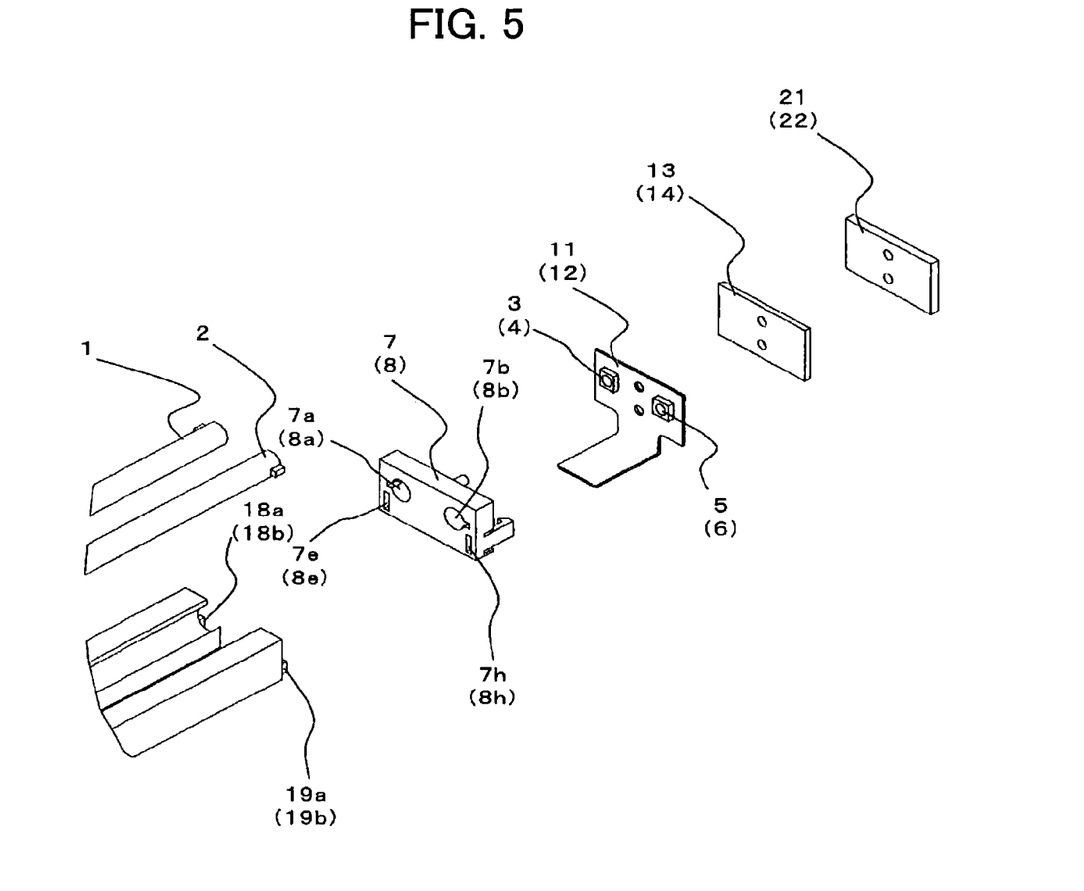
FIG. 5 is an exploded view illustrating a reflector and the holder in the image sensor (illuminating apparatus) of Embodiment 1.

FIG. 5 is an exploded view illustrating the reflector of the image sensor (illuminating apparatus) and the holder thereof according to Embodiment 1. The reflector 18 and the reflector 19 include a positioning protrusion 18a (18b) and a positioning protrusion 19a (19b), respectively. It is preferable that those positioning protrusions should not be cylindrical so as to suppress a rotation of the reflector 18 and the reflector 19. In addition, those positioning protrusions are formed so as to protrude along the lengthwise direction of the reflector 18 and the reflector 19 from the respective one ends. The positioning protrusion 18*a* (18*b*) is fitted in the reflector holding hole 7*e* (8*e*). The positioning protrusion 19*a* (19*b*) is fitted in the reflector holding hole 7*h* (8*h*). When the light guide 1, the light guide 2, and, the reflector 18, the reflector 19 are held in parallel one another, light from the light guide 1 and the light guide 2 can be reflected with a uniform orientation characteristic, thereby enabling a realization of an illuminating apparatus with a small illumination deviation.

As illustrated in FIG. 1, FIG. 3, and FIG. 5, in the structure formed in the holder 7 (8), the side faces of the insertion hole 7*a* (8*a*), the insertion hole 7*b* (8*b*), the reflector holding hole 7*e* (8*e*) and the reflector holding hole 7*h* (8*h*) are orthogonal to the opposing faces of the holder 7 and the holder 8 (surface orthogonal to main scanning direction). Hence, the holder 7 (8) can be easily manufactured, and parallel holding of the light guide 1, the light guide 2, the reflector 18, and the reflector 19 can be easily made.

Figure 6:
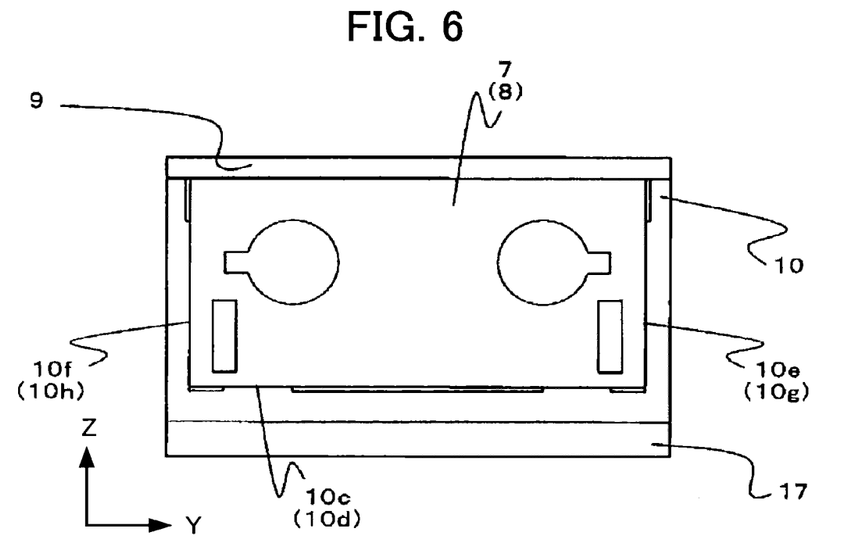
FIG. 6 is a cross-sectional view illustrating a position of the holder of the image sensor as viewed in the main scanning direction according to Embodiment 1.

FIG. 6 is a cross-sectional view illustrating a position of the holder of the image sensor as viewed in the main scanning direction according to Embodiment 1. The casing 10 includes, at an assembled portion with the holder 7 (8), a Z-direction positioning plane 10*c* (10*d*), a Y-direction positioning plane 10*e* (10*g*), and a Y-direction positioning plane 10*f* (10*h*). Those positioning planes cause the Y-direction center (that is, the illumination center) of the holder 7 (8) to match the optical axis.

Figure 7:
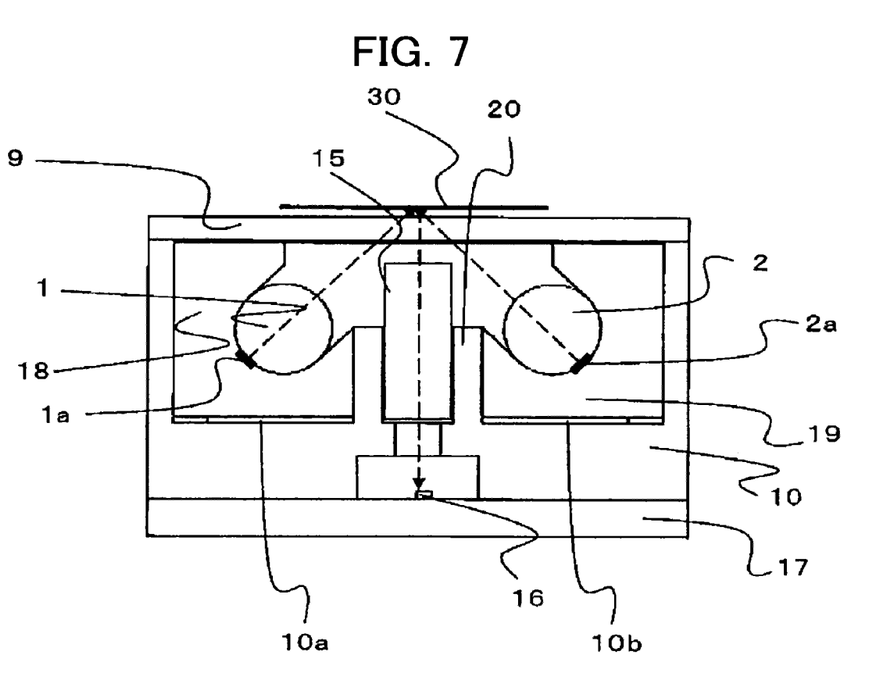
FIG. 7 is a cross-sectional view illustrating a position of the light guide of the image sensor as viewed in the main scanning direction according to Embodiment 1.

FIG. 7 is a cross-sectional view illustrating a position of the light guide of the image sensor as viewed in the main scanning direction according to Embodiment 1. As illustrated in FIG. 1, the reflector 18 (light guide casing) runs in the main scanning direction. In FIG. 7, the reflector 18 reflects light entering the light guide 1 from the light source 3 and the light source 4 to the direction of a reading position (a position in the reading object 30 to be irradiated with light from the light guide 1) across the whole length of the light guide 1. The casing 10 includes a first groove 10*a* which is disposed at an opposite side to the clear plate 9 relative to the light guide 1, and which supports the reflector 18. Likewise, the reflector 19 (light guide casing) runs in the main scanning direction, and reflects light entering the light guide 2 from the light source 5 and the light source 6 to the direction of the reading position (a position in the reading object 30 to be irradiated with light from the light guide 2) across the whole length of the light guide 2. As to the casing 10, likewise, a second groove 10*b* is provided which is disposed at an opposite side to the clear plate 9 relative to the light guide 2, and which supports the reflector 19.

According to Embodiment 1, the lens body 15 is a rod lens array, but may be a lens array like a micro lens array that converges light on a line sensor (sensor array). In the case of a composite optical member, when, for example, the image sensor is a reflector light source type, a lens or a mirror forming an image sensor (image reader apparatus) of a reduction optical system is applicable. The sensor 16 is a sensor array including a sensor IC (light receiving element) that receives light that has passed through the lens body 15.

The rod lens array has multiple rod lenses forming an erected image at an equal magnification power, being arranged side by side in the main scanning direction of the image sensor and fastened by a frame or the like. Hence, according to Embodiment 1, for the purpose of simplification, only a contour of a rectangle elongated in the main scanning direction will be illustrated in the figures. The focal point of the lens body 15 is set in such a way that an erected equal magnification image on the reading-object fed surface is formed on the sensor 16. An arrow of dashed lines in FIG. 7 directed from the reading object 30 toward the sensor 16 through the lens body 15 indicates the optical axis direction of the lens body 15. In addition, the arrow of dashed lines indicates reflected light emitted from the light guide 1 (scattering area 1*a*) and the light guide 2 (scattering area 2*a*) and reflected by the reading object 30.

In FIG. 7, the sensor board 17 is a circuit board on which the sensor 16 is mounted. It is not illustrated in the figure but the sensor board 17 has the sensor 16 which receives light converged by the lens body 15 and performs photoelectric conversion, and which is disposed in the main scanning direction by what corresponds to the reading length. In addition, the sensor board includes a connecter connectable with an external device. The connector outputs, as image signals, electric signals obtained by photoelectric conversion by the sensor IC (sensor 16) on the sensor board 17 to the exterior. The sensor board 17 is fastened to an edge of the other opening of the casing 10 by a fastener like a screw. The fastener is not limited to a screw. For example, an attachment disclosed in Patent Literature 2 is applicable. A step like the above-explained step having a width decreasing toward the one opening may be formed at the other opening of the casing 10 (a step having a width decreasing toward the other opening of the casing 10), and the sensor board 17 may be fitted in this step. The fastener may be the screw or the attachment as explained above in this case.

The clear plate 9 is disposed between the light guide 1, the light guide 2 and the reading object 30, and prevents foreign material from entering the interior of the casing 10. In addition, the clear plate 9 is formed of a transparent material to suppress an attenuation of light (line light source) emitted from the light guide 1 and the light guide 2 and reflected light from the reading object 30. The light guide 1 and the light guide 2 serve as a line light source that emit stripe light, and are disposed in such a way that the center axes are in parallel with the main scanning direction so as to emit light to the reading object 30 along the main scanning direction at the reading position. The disposition of the light guide 1 and that of the light guide 2, and the disposition of the scattering area 1*a* and that of the scattering area 2*a* are determined in consideration of the refraction of light by the clear plate 9 to emit light to the reading position.

The reflector 18 and the reflector 19 are disposed in the casing 10 below the light guide 1 and the light guide 2, respectively. The reflector 18 and the reflector 19 further reflect light emitted in the opposite direction to the light emitted from the light guide 1 and the light guide 2 toward the reading object 30, and increases the intensity of light emitted to the surface of the reading object 30. Hence, the dispositions of those reflectors are designed in consideration of the refraction of light like the disposition of the light guide 1 and that of the light guide 2 as explained above. The reflector 18 and the reflector 19 are each formed as a curved surface in accordance with the side face of the light guide 1 and that of the light guide 2.

Figure 8:
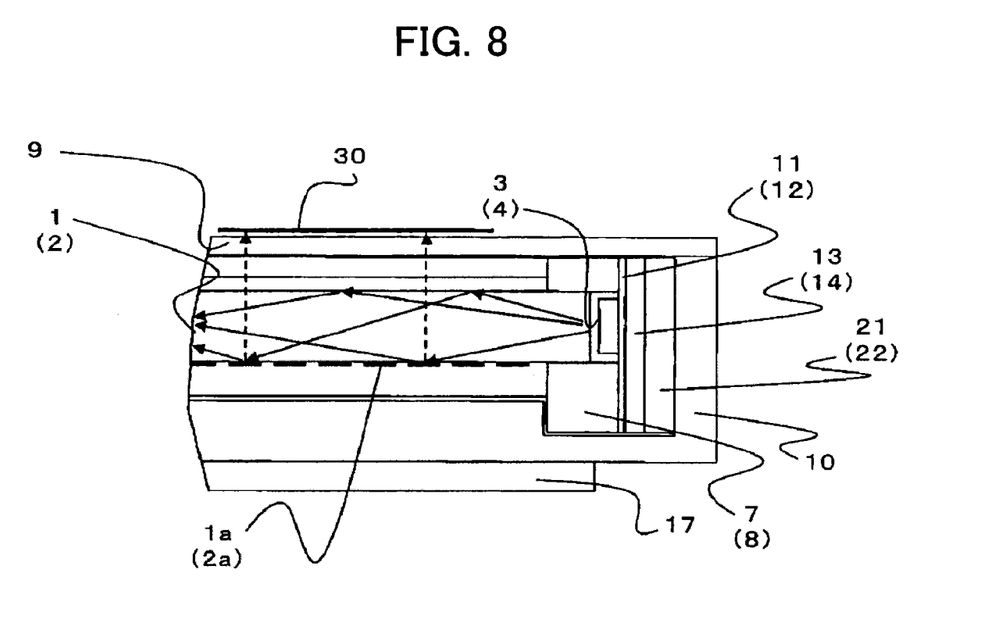
FIG. 8 is a cross-sectional view illustrating the center of the light guide of the image sensor as viewed in the sub scanning direction according to Embodiment 1.
Figure 9:
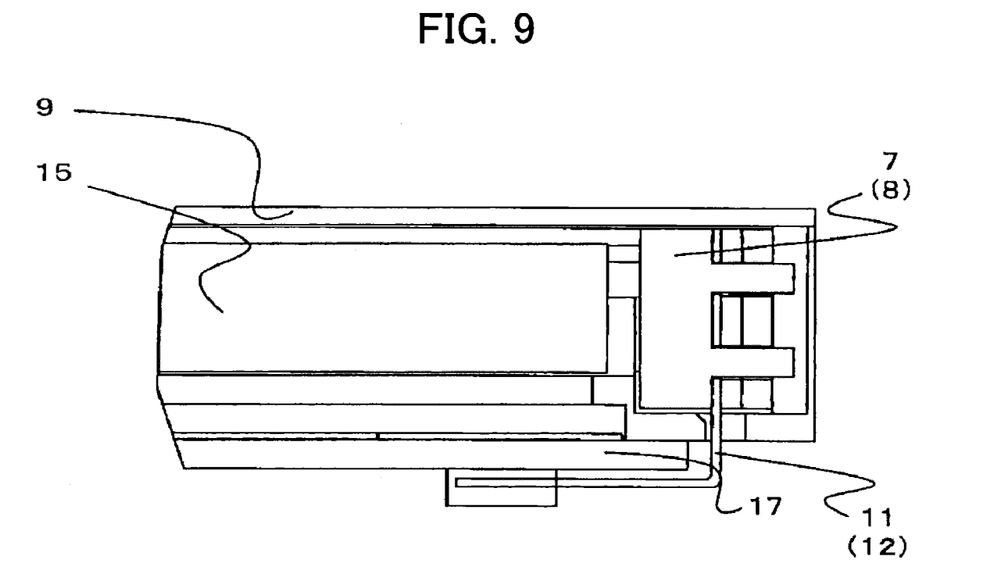
FIG. 9 is a cross-sectional view illustrating a rod lens array in the image sensor as viewed in the sub scanning direction according to Embodiment 1.

FIG. 8 is a cross-sectional view illustrating the light guide of the image sensor as viewed in the sub scanning direction according to Embodiment 1. FIG. 9 is a cross-sectional view illustrating the rod lens array of the image sensor as viewed in the sub scanning direction according to Embodiment 1. FIG. 8 is also a cross-sectional view as viewed in the sub scanning direction at the light-guide-1 side and illustrates only the nearby portion of the holder 7. FIG. 9 illustrates only the nearby portion of the holder 7.

In FIG. 8, incident light from the light source 3 is guided through the interior of the light guide 1, and travels forward while repeating a reflection by the wall of the light guide 1. Subsequently, such light reaches the scattering area 1a formed by a white printing pattern or a concavo-convex shape formed along the lengthwise direction of the light guide 1, and is emitted as line light from the portion opposite to the scattering area 1a (a surface portion of the light guide 1). An arrow indicated by dots in FIG. 8 and directed from the light guide 1 toward the reading object 30 indicates the major direction of the light reflected by the scattering area 1a and emitted to the reading object 30. The same is true of the incident light from the light source 4, the light source 5, and the light source 6.

An explanation will be given below of a method for manufacturing the illuminating apparatus and the image sensor according to Embodiment 1. The image sensor optically reads the fed reading object, and generates image data thereof. The basic process of the method for manufacturing the image sensor can be roughly divided into an illuminating apparatus assembling process, a sensor (photo receiver) arraying process, a rod lens array disposing process, and an illuminating apparatus mounting process. Among those processes, it is necessary to carry out the illuminating apparatus assembling process prior to the illuminating apparatus mounting process. In addition, when it is difficult to attach the rod lens array after the illuminating apparatus mounting process, the rod lens array disposing process should be carried out prior to the illuminating apparatus mounting process. The sensor arraying process is to mount the sensor 16 on the sensor board 17 along the main scanning direction. The sensor board 17 is fastened to an edge of the other opening of the casing 10 by a screw or the like. In the following explanation, the symmetrical structure of the image sensor in the main scanning direction and the symmetrical structure thereof in the sub scanning direction according to Embodiment 1, only the one-side structure will be explained in some processes to explain the respective processes.

As illustrated in FIG. 3 and FIG. 5, in the illuminating apparatus assembling process, first, the light guide 1 is disposed in the groove of the reflector 18. The light guide 1 is fitted in the insertion hole 7a (8a) of the holder 7 (8) in such a way that the protrusion 1b of the light guide 1 is fitted in the notch 7f (8f) provided in the insertion hole 7a (8a) of the holder 7 (8). While at the same time, the positioning protrusion 18a (18b) of the reflector 18 is fitted in the reflector holding hole 7e (8e) provided in the holder 7 (8), thereby fastening the reflector 18 to the holder 7 (8). The same is true of the attachment of the light guide 2 and the reflector 19 to the holder 7 (8). When the protrusion 1b and the notch 7f (8f) are engaged with each other, the light emitting angle of the light guide 1 can be fixed to a certain angle. As a result, it becomes possible to suppress a shifting of the emission direction of the light guide 1 since the light guide 1 is unrotatable relative to the holder 7 (8). The protrusion 1b of the light guide 1 is fitted in up to an end of the holder 7 (8) which is a light guide attaching surface provided in the notch 7f (8f).

In addition, as illustrated in FIG. 4, the light source board 11 (12), the heat radiation sheet 13 (14), and the heat radiation plate 21 (22) are attached to the opposite side of the holder 7 (8) to the side at which the light guide 1 is fitted. The light source board 11 is attached with reference to the board attaching face of the holder 7 (8) in such a way that the light source 3 (4) of the light source board 11 and the light source 5 (6) thereof are disposed in the insertion hole 7a (8a) and the insertion hole 7b (8b), respectively, with those light sources facing with the respective end faces of the light guide 1 and the light guide 2 in the lengthwise direction. The positions of the light source board 11 (12) in the Y direction and the Z direction are set in accordance with the engagement of the board positioners 7i (8i) of the holder 7 (8) with the holes of the light source board 11 (12). Since the board positioners 7i (8i) are provided at the two locations, a rotation of the light source board 11 (12) around the main scanning direction is suppressed (see FIG. 4). Next, the heat radiation sheet 13 (14) is attached with reference to the heat radiation sheet attaching surface of the light source board 11. Subsequently, the heat radiation plate 21 (22) is attached to the opposite surface of the heat radiation sheet 13 (14) to the attaching direction to the light source board 11 (12). Holes in the heat radiation sheet 13 (14) and in the heat radiation plate 21 (22) are provided to avoid an interference with the board positioners 7i (8i) of the holder 7 (8) (see FIG. 4). The heat radiator holder 7c (8c) provided at the holder 7 (8) integrally catches the light source board 11 (12), the heat radiation sheet 13 (14), and the heat radiation plate 21 (22), and enhances the intimate contact therebetween, more specifically, the intimate contact in the X direction.

As illustrated in FIG. 7, in the rod lens array disposing process, the rod lens array (lens body 15) that converges light to the sensor 16 fixed to the casing 10 is fixed inwardly in the casing 10 relative to the position where the sensor board 17 is fixed in the casing 10. The rod lens array is provided at a shaded portion 20 formed in the casing 10, and is fixed to an opening running in the main scanning direction. The positioning of the rod lens array in the main scanning direction and in the sub scanning direction can be set in accordance with the opening running in the main scanning direction, but an adjusting mechanism may be additionally provided in the casing 10. When this adjusting mechanism is formed in the casing 10 at an opposite side to the side at which the sensor board 17 is attached relative to the shaded portion 20, the shading of the sensor board 17 becomes easy.

In the illuminating apparatus mounting process, as illustrated in FIG. 6, the holder 7 (8) of the illuminating apparatus is mounted on and attached to the casing 10 with reference to the positioning plane 10c (10d) provided at the end of the casing 10 in the main scanning direction and spreading in the Z direction, and the positioning planes 10e (10g) and 10f (10h) spreading in the Y direction.

Figure 10:
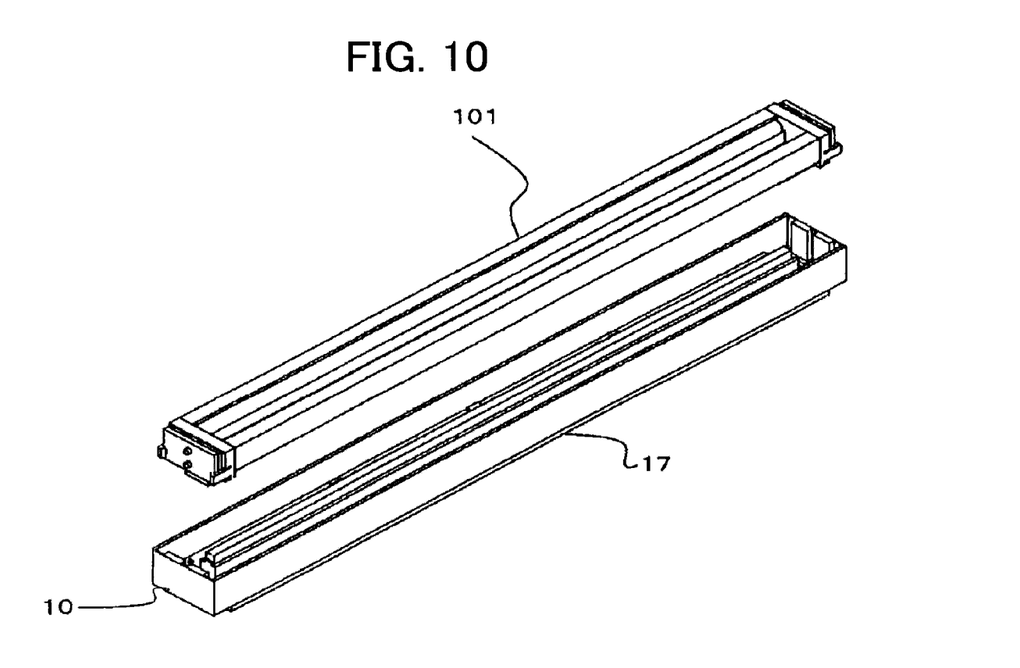
FIG. 10 is an exploded perspective view illustrating an illuminating apparatus and a casing according to Embodiment 1.

FIG. 10 illustrates a case in which the illuminating apparatus mounting process is carried out after the rod lens array disposing process. FIG. 10 is an exploded perspective view illustrating the illuminating apparatus and the casing according to Embodiment 1. An illuminating apparatus 101 illustrated in FIG. 10 includes, as explained above, the light guide 1, the light guide 2, the light source 3 (5), the light source 4 (6), the holder 7 (8), the light source board 11 (12), the heat radiation sheet 13 (14), the reflector 18 (19), and the heat radiation plate 21 (22).

Figure 11:
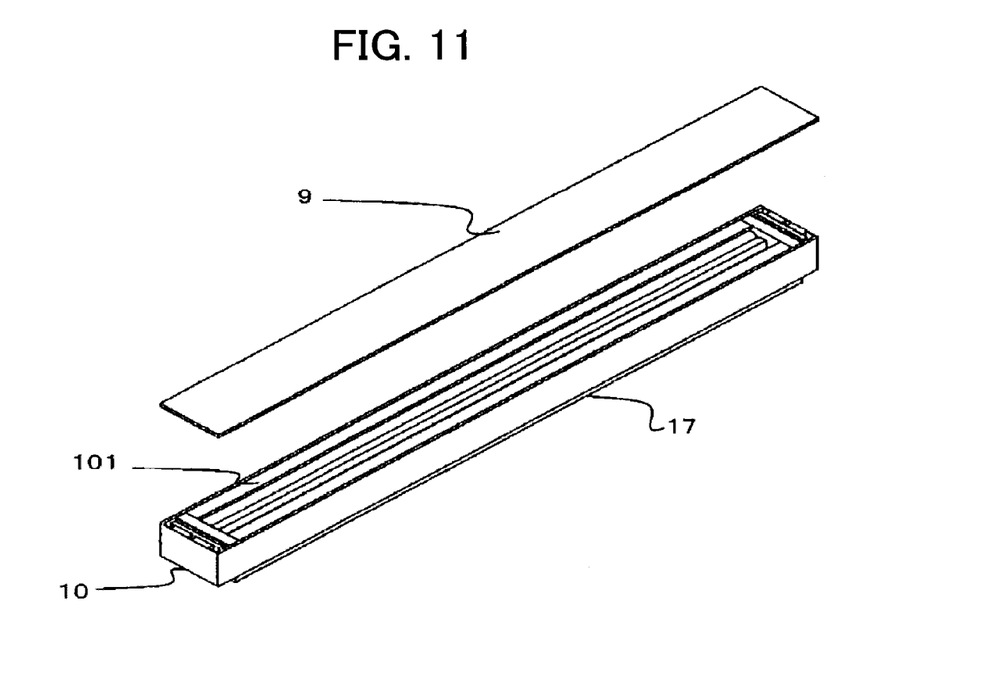
FIG. 11 is an external view of the image sensor with a clear plate being detached according to Embodiment 1.

A clear plate mounting process is to mount the clear plate 9 on the casing 10. When the clear plate 9 is mounted on the image sensor according to Embodiment 1, it is necessary that the clear plate mounting process should be carried out at least after the illuminating apparatus assembling process, the rod lens array disposing process, and the illuminating apparatus mounting process. The mount face for the clear plate 9 is consistent with the contour of the clear plate 9, and a stepped stage in a shape that can hold the clear plate 9 may be formed at an edge of the one opening of the casing 10. FIG. 11 is an external view illustrating the image sensor of Embodiment 1 with the clear plate being detached.

As explained above, the light guides, the reflectors, the light source boards, the heat radiation sheet, and the heat radiation plate are assembled with reference to the holder. Hence, the positional relationships among the light guides, the reflectors, the light source boards, and the heat radiator can be adjusted through only the holder. That is, an illuminating apparatus can be obtained which can easily and precisely align the optical axis to the reading object like a document.

In addition, the image sensor is formed by assembling the holder of the illuminating apparatus with reference to a reference plane of the casing of the image sensor, and thus an image sensor can be obtained which can precisely align the optical axis to the reading object like a document and the rod lens array.

Embodiment 2

Figure 12:
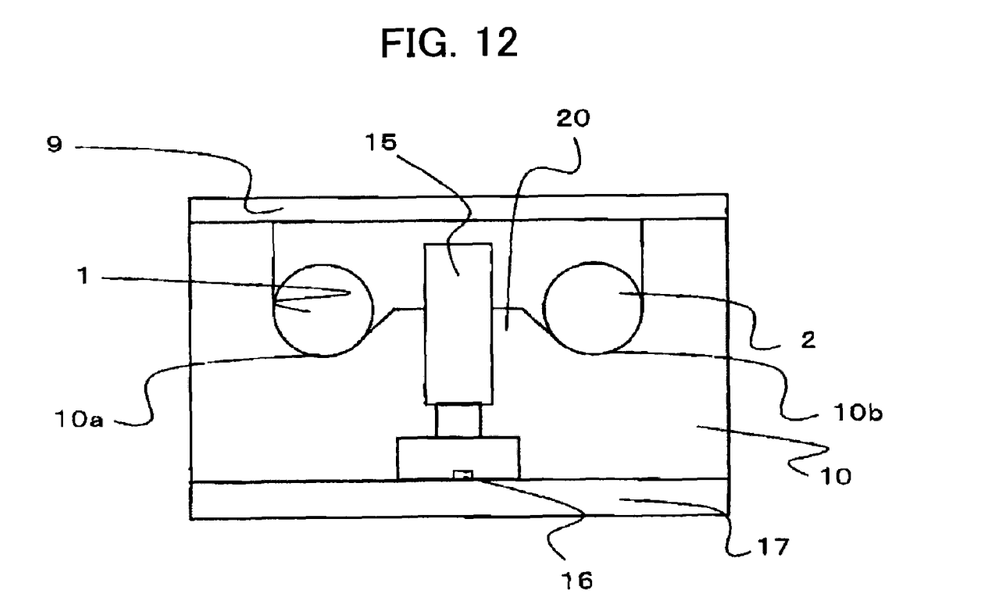
FIG. 12 is a cross-sectional view illustrating a center portion of an image sensor in the main scanning direction according to Embodiment 2 of the present disclosure as viewed in the main scanning direction.

An explanation will be given of a case in which the reflector and the casing are formed integrally with each other according to Embodiment 2. FIG. 12 is a cross-sectional view illustrating a main-scanning-direction center of an image sensor according to Embodiment 2 as viewed in the main scanning direction. According to Embodiment 2, the first groove 10a of the casing 10 and the second groove 10b thereof are formed in shapes that are curved shapes covering the light guide 1 and the light guide 2, respectively, and the surface of the first groove 10a of the casing 10 and that of the second groove 10b are whitened or mirror-like finished. Hence, according to this illuminating apparatus, the reflector 18 and the reflector 19 of Embodiment 1 can be omitted. The manufacturing method and the like other than the omission of the reflector 18 and the reflector 19 are the same as those of Embodiment 1.

According to Embodiment 2, also, the light guides, the light source boards, the heat radiation sheet, and the heat radiation plate are assembled with reference to the holder. Hence, the positional relationships among the light guides, the light source boards, and the heat radiator can be adjusted through only the holder. That is, an illuminating apparatus can be obtained which can easily and precisely align the optical axis to the reading object like a document.

In addition, the image sensor is formed by assembling the holder of the illuminating apparatus with reference to a reference plane of the casing of the image sensor, and thus an image sensor can be obtained which can precisely align the optical axis to the reading object like a document and the rod lens array.

The aforementioned embodiments permit various modifications within the scope and spirit of the present disclosure. The aforementioned embodiments are to explain the present disclosure, and are not intended to limit the scope and spirit of the present disclosure. The scope and spirit of the present disclosure are defined by the appended claims rather than the embodiments. Various modifications within the appended claims and also within the equivalent range to the claims should be within the scope and spirit of the present disclosure.

The present application claims a priority based on Japanese Patent Application No. 2012-100204 filed on Apr. 25, 2012 and including the specification, the claims, the drawings, and the abstract. The disclosure of this Japanese Patent Application is herein incorporated in this specification by reference.

REFERENCE SIGNS LIST

1 Light guide
1a Scattering area
1b Protrusion
2 Light guide
2a Scattering area
2b Protrusion
3, 4, 5, 6 Light source
7 Holder
7a Insertion hole
7b Insertion hole
7c Heat radiator holder
7d Heat radiator holder
7e Reflector holding hole
7f Notch
7g Notch
7h Reflector holding hole
7i Board positioner
8 Holder
8a Insertion hole
8b Insertion hole
8c Heat radiator holder
8d Heat radiator holder
8e Reflector holding hole
8f Notch
8g Notch
8h Reflector holding hole
8i Board positioner
9 Clear plate
10 Casing
10a First groove
10b Second groove
10c, 10d Z-direction positioning plane
10e, 10f, 10g, 10h Y-direction positioning plane
11, 12 Light source board
13, 14 Heat radiation sheet
15 Lens body
16 Sensor
17 Sensor board
18, 19 Reflector
18a, 18b Positioning protrusion
19a, 19b Positioning protrusion
20 Shaded portion
21, 22 Heat radiation plate
23 Screw
30 Reading object
101 Illuminating apparatus

The invention claimed is:

1. An illuminating apparatus comprising:
a casing;
a columnar light guide retained in the casing;
a board including a light source fastened on one surface thereof; and
a holder having,
a through-hole into which an end of the light guide in a columnar center axis direction is fitted to hold the light guide, said light source facing an end face of the light guide in the columnar center axis direction, the through-hole optically passing all the way through a first surface of the holder and a second surface opposite to the first surface of the holder, the through-hole transmitting light from the light source to the light guide,
a protruding pin extending from the holder along the columnar center axis direction and that is fitted into a hole of the board, including the light source and
a fitting claw that holds the board along a short direction of the casing.

2. An image sensor comprising:
the illuminating apparatus according to claim 1;
a lens body that converges reflected light emitted from the illuminating apparatus and reflected by an irradiation object;
a photo receiver that receives the reflected light that has passed through the lens body; and
a casing that retains or holds thereinside the illuminating apparatus, the lens body, and the photo receiver.

3. An illuminating apparatus comprising:
a casing;
a columnar light guide retained in the casing;
a board including a light source fastened on one surface thereof; and
a holder formed with a through-hole into which an end of the light guide in a columnar center axis direction is fitted to hold the light guide, said light source facing an end face of the light guide in the columnar center axis direction in the through-hole,
a protruding pin that is fitted into a hole of the board including the light source, and
a fitting claw that holds the board along a short direction of the casing,
wherein
the board includes a light source board, a heat radiation sheet and a heat radiation plate;
the protruding pin passes through the light source board, the heat radiation sheet and the heat radiation plate; and
the fitting claw allows the heat radiation sheet and the heat radiation plate to engage with each other along a lengthwise direction of the casing.

4. The illuminating apparatus according to claim 3, wherein
the light source board, the heat radiation sheet and the heat radiation plate are disposed between the holder and the casing.

\* \* \* \* \*